United States Patent [19]

Brossier et al.

[11] Patent Number: 5,305,600
[45] Date of Patent: Apr. 26, 1994

[54] PROPULSION ENGINE

[75] Inventors: Pascal Brossier, Lieusaint; Marc G. Loubet, Cesson; Georges Mazeaud, Yerres; Claudine L. M. Planquet, Vert Saint Denis, all of France

[73] Assignee: Societe Nationale d'Etude et de Construction de Motors d'Aviation "SNECMA", Paris, France

[21] Appl. No.: 25,780

[22] Filed: Mar. 3, 1993

[30] Foreign Application Priority Data

Mar. 4, 1992 [FR] France ............... 92 02580

[51] Int. Cl.⁵ .................................. F02K 3/02
[52] U.S. Cl. ........................ 60/226.3; 60/39.07; 60/39.183; 60/263
[58] Field of Search ........... 60/226.3, 39.183, 39.07, 60/262, 263

[56] References Cited

U.S. PATENT DOCUMENTS

| | | | |
|---|---|---|---|
| 3,252,282 | 5/1966 | Grieb | 60/263 |
| 3,719,428 | 3/1973 | Dettmering | 60/39.183 |
| 4,519,208 | 5/1985 | Loisy et al. | 60/263 |

FOREIGN PATENT DOCUMENTS 0076192  3/1983  European Pat. Off. .
0980306  1/1965  United Kingdom .

Primary Examiner—Richard A. Bertsch
Assistant Examiner—Michael I. Kocharov
Attorney, Agent, or Firm—Oblon, Spivak, McClelland, Maier & Neustadt

[57] ABSTRACT

The rotor of a fan disposed in the annular noncombusted air flow duct of a turbojet propulsion engine of the bypass type is carried by a rotary body which includes the rotor assembly of a multi-stage turbine driven by noncombusted air supplied thereto by an axisymmetrical auxiliary duct which diverts noncombusted air from the primary duct of the engine just downstream of the compressor.

7 Claims, 2 Drawing Sheets

PROPULSION ENGINE

BACKGROUND OF THE INVENTION

1. Field of the Invention

The invention relates to propulsion engines of the turbojet type which are particularly suitable for supersonic aircraft.

A development sought in the design of propulsion engines in order to improve their adaptability to the variable conditions of use in the different flight phases of supersonic aircraft, is to provide a variable operating cycle for the engine. The aim, in particular, is to reconcile the need to obtain a powerful thrust per unit of throughput and, consequently, a high speed for the gases on ejection at supersonic speeds, with the need to reduce the speed of ejection at subsonic speeds, particularly during take-off, so as to limit the noise nuisance.

2. Description of the Prior Art

One solution meeting these aims is described in EP-A-0 076 192, and provides for two connected coaxial propulsion units, an inner unit and an outer unit. However, this structure includes two separate combustion chambers and several rotary bodies with concentric shafts, which renders implementation and operation highly complex.

SUMMARY OF THE INVENTION

It is an object of the invention to achieve the aims mentioned above, using a simpler structure.

To this end, according to the invention there is provided a propulsion engine of the turbojet type, particularly for supersonic aircraft, comprising a primary unit including at least one compressor and a primary duct leading from the downstream end of said at least one compressor and forming part of the primary air flow path through said engine, a secondary unit coaxially surrounding said primary unit and including an annular noncombusted air flow duct and a fan rotor, said fan rotor having at least one stage of compression rotor blades disposed in said cold flow duct, a rotary body which carries said fan rotor, support bearings mounting said rotary body to surround said primary duct, a multi-stage external turbine having a fixed stator assembly and a rotor assembly connected to said rotary body whereby said fan rotor is arranged to be driven by said external turbine, and an axi-symmetrical auxiliary duct communicating with said primary duct near the downstream end of said at least one compressor and leading to said external turbine whereby said external turbine is driven by non-combusted air diverted from said primary duct.

Two advantageous embodiments may be envisaged, depending on whether the external turbine is placed downstream or upstream of the fan rotor.

The invention may be better understood from the following description of two preferred embodiments of the invention, given by way of example only, with reference to the attached drawings.

DESCRIPTION OF THE PREFERRED EMBODIMENTS

Figure 1:
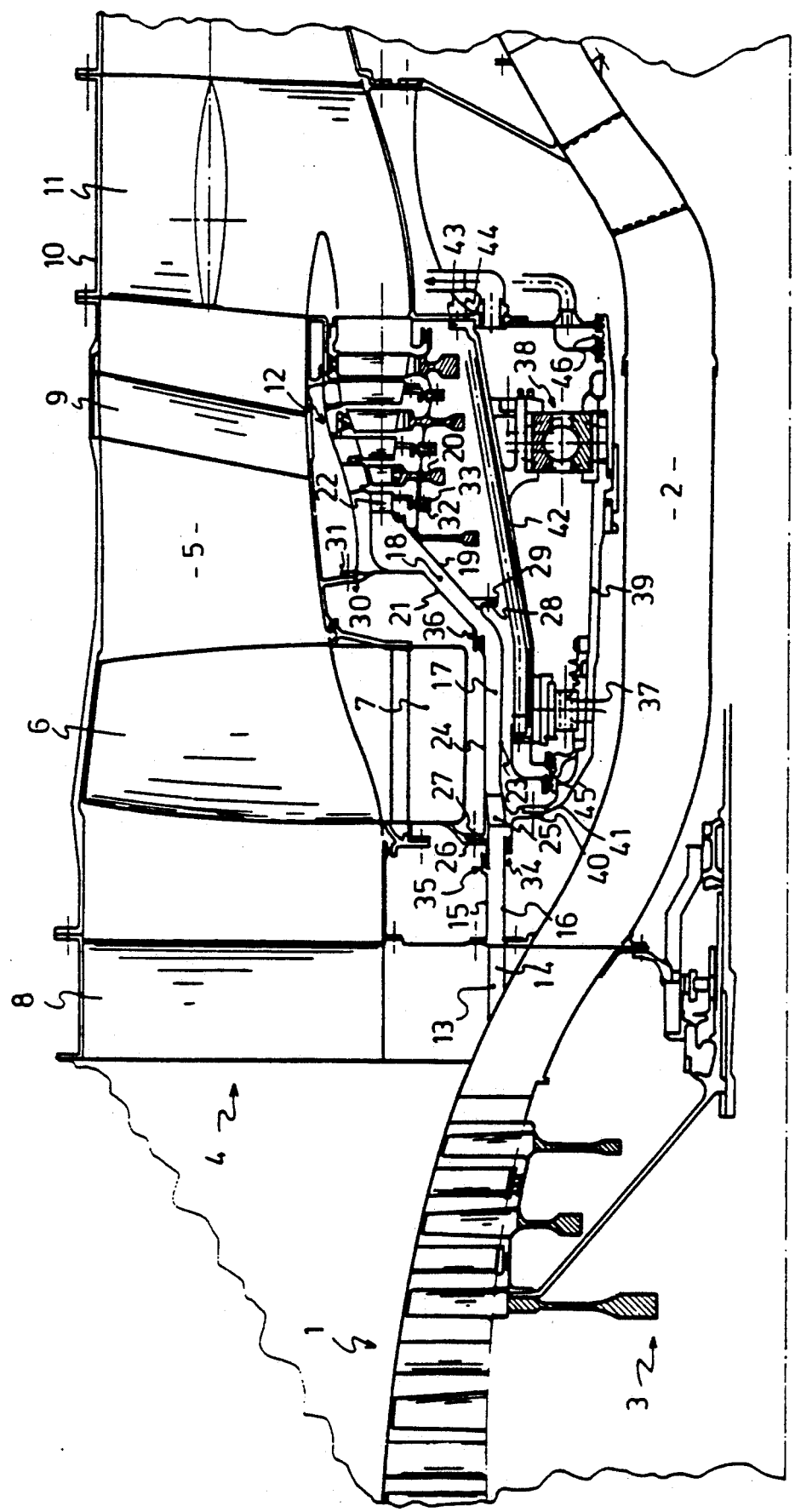
FIG. 1 shows a diagrammatic axial sectional view of part of a first embodiment of a propulsion engine in accordance with the invention.
Figure 2:
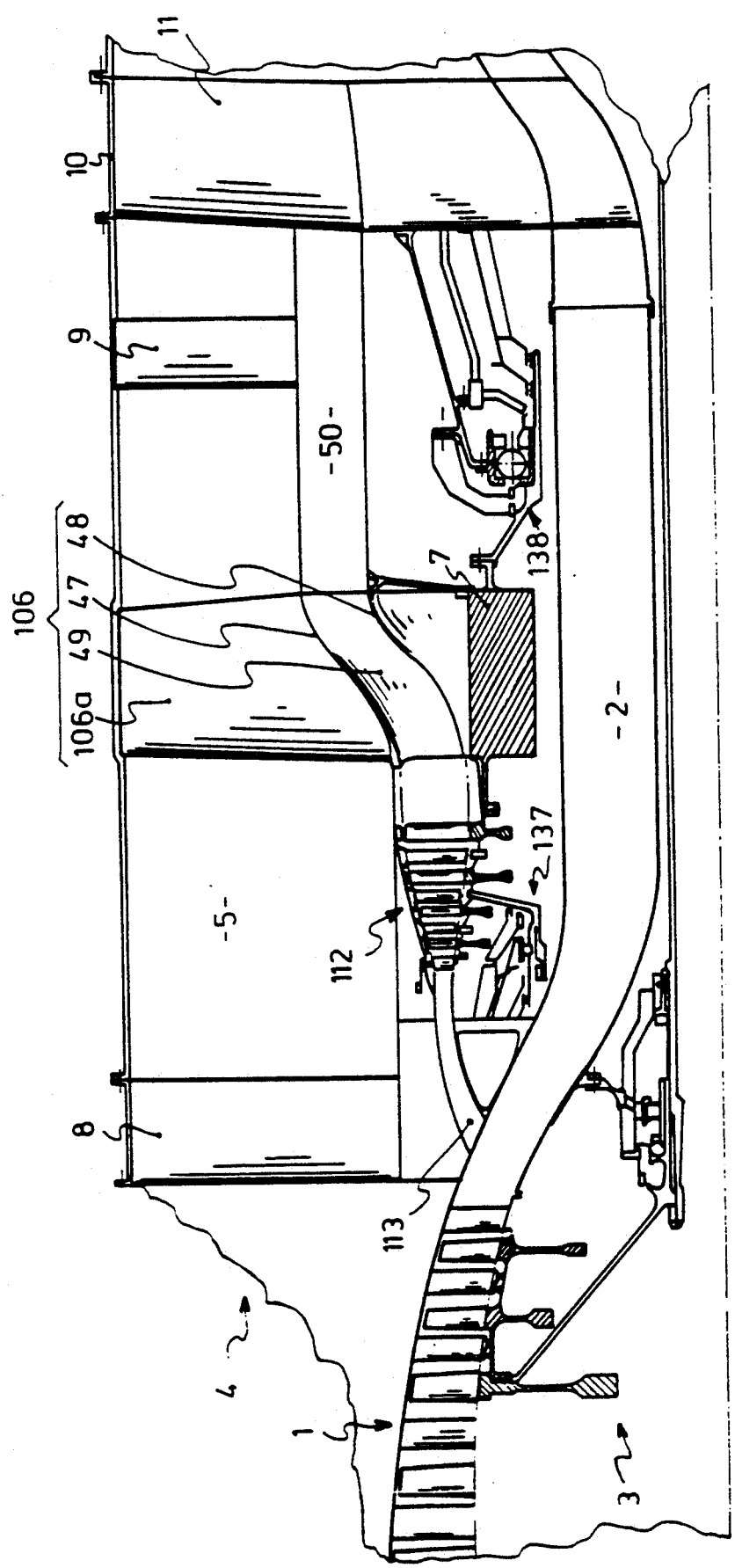
FIG. 2 shows a view similar to that of FIG. 1, but of a second embodiment of a propulsion engine in accordance with the invention.

The propulsion engines illustrated in FIGS. 1 and 2 are of the turbojet type particularly intended for supersonic aircraft. Only the central part of the engine is shown in each drawing, but in a manner known per se each engine includes, in a direction from upstream to downstream with respect to the normal direction of flow of gases through the engine, an air intake, at least one high pressure compressor 1, a primary duct 2 through which the compressed air from the outlet of the compressor 1 flows to a combustion chamber, a turbine driven by the gases from the combustion chamber, and a gas ejection assembly through which the gases from the turbine flow to provide propulsion forces in a manner well known in the art, the compressor, primary duct, combustion chamber, turbine, and ejection assembly forming a primary unit 3.

In accordance with the invention, the primary unit 3 is surrounded by a secondary unit 4 which is co-axial therewith and includes an annular noncombusted air flow duct 5 in which there is arranged, in line with the primary duct 2 and in a space extending axially between the outlet of the compressor 1 and the inlet to the combustion chamber, at least one stage of movable compression blades 6 or 106 belonging to a fan rotor 7, preceded by profiled arms 8 forming a fixed input guide stage, and followed by a stage of fixed blades 9 forming a flow straightener. The annular duct 5 is defined externally by an envelope forming a structural casing 10 and including support arms 11 at the downstream end.

In the first embodiment of the invention shown in FIG. 1, the fan rotor 7 is driven by a multi-stage cold turbine 12 positioned downstream relative to the fan. An axi-symmetrical auxiliary duct 13 supplies noncombusted air to the turbine 12 and is composed of three sections. An upstream first section 14 is connected to the primary duct 2, downstream of the final stage of the compressor 1, and is defined by an annular outer wall 15 and an annular inner wall 16, both of which are fixed. An intermediate second section 17 passes under the disc of the fan rotor 7, and a downstream third section 18 takes the air from the second section at the level of the downstream edge of the fan rotor 7 to the inlet of the cold turbine 12.

The downstream section 18 is defined by an annular inner wall 19 rigidly connected at its downstream end to the rotor assembly 20 of the external turbine 12 by bolted radial flanges 32,33, and by an annular outer wall 21 rigidly connected at its downstream end to the fixed stator structure 22 of the external turbine 12 by bolted radial flanges 31,32. The intermediate section 17 is defined by two rotary annular walls, an inner wall 23 rigidly connected at its downstream end to the inner wall 19 of the downstream section 18 by bolted radial flanges 28,29, and an outer wall 24 rigidly connected near its upstream end to the disc of the fan rotor 7 by bolted radial flanges 26,27. The two rotary walls 23 and 24 of the intermediate section 17 are interconnected near their upstream end by a stage of blades 25 which acts an an additional turbine stage. The connections between the fixed and rotary walls of the duct sections are fitted with sealing joints of the labyrinth type as indicated at 34,35 and 36 in FIG. 1.

In the space between the primary duct 2 and the rotary body constituted by the fan rotor 7 and the turbine rotor assembly 20, there are situated upstream and downstream bearing units 37 and 38 respectively, the rotary parts of which are connected to a support 39 rigidly secured at its upstream end to the rotary body by means of bolted radial flanges 40 and 41, and the fixed parts of which are secured to a fixed support 42 rigidly connected at its downstream end, by means of bolted radial flanges 43 and 44, to the fixed structure of the casing 10 having radial arms 11. Upstream and downstream seals 45 and 46, for example of the labyrinth type, bound the bearing enclosure.

The arrangement which has just been described with reference to FIG. 1 permits a supply of air, compressed by the compressor 1 of the primary engine unit, to be delivered to the external turbine 12 which drives the rotor 7 of the fan without this bringing about an increase in overall size, or, consequently, an increase in drag which would be prejudicial to the performance sought, particularly with respect to thrust and fuel consumption, while still benefitting from the noise abatement effects due to the secondary flow. The arrangement also provides a balancing of axial stresses between the fan and the turbine.

In the second embodiment of the propulsion engine shown in FIG. 2, the same references have been used for elements which correspond to elements of the first embodiment. Thus, here again are the compressor 1 and the primary duct 2 of the primary engine unit, and a coaxial secondary unit 4 including a fan rotor 7, an input guide stage 8, a flow straightener 9, and a structural casing 10 with radial arms 11.

As in the first embodiment the fan rotor 7 is driven by a multi-stage external turbine, but in the second embodiment the said external turbine 112 is placed on the upstream side of the fan rotor 7. Thus the auxiliary axisymmetrical duct 113 which supplies the compressed air to drive the turbine 112 is a fixed structure which is secured to the primary duct 2 downstream of the final stage of the compressor 1. In this case, the blades 106 of the fan rotor are two tiered, being divided by a first platform 47 into an outer portion 106a disposed in the noncombusted flow duct 5, and an inner profiled portion 49 between the first platform 47 and a second platform 48 spaced radially inwardly thereof. The platforms 47 and 48 of the blades 106 define therebetween a flow path for the air between the turbine 112 and an annular exhaust duct 50, and the portions 49 of the blades 106 in this flow path act as an additional turbine stage. As before, the rotary body formed by the fan and turbine rotors is carried by an upstream bearing 137 and a downstream bearing 138.

We claim:

1. A propulsion engine of the turbojet type having a gas ejection assembly comprising
   a primary unit including at least one compressor and a primary duct leading from the downstream end of said at least one compressor and forming part of the primary air flow path through said engine in a flow direction towards the gas ejection assembly,
   a secondary unit coaxially surrounding said primary unit and including an annular noncombusted air flow duct and a fan rotor, said fan rotor having at least one stage of compression rotor blades disposed in said noncombusted air flow duct,
   a rotary body which carries said fan rotor,
   support bearings mounting said rotary body so as to surround said primary duct,
   a multi-stage external turbine having a fixed stator assembly and a rotor assembly connected to said rotary body such that said fan rotor is driven by the flow of noncombusted air through said external turbine, and
   an axisymmetrical auxiliary duct communicating with said primary duct near the downstream end of said at least one compressor and leading to said external turbine such that noncombusted air directed from said primary duct continuously flows through said auxiliary duct in the flow direction towards the gas ejection assembly.

2. A propulsion engine according to claim 1, wherein said external turbine is positioned downstream of said fan rotor.

3. A propulsion engine according to claim 1, wherein said external turbine is positioned upstream of said fan rotor.

4. A propulsion engine according to claim 3, wherein said axisymmetrical auxiliary duct is formed by fixed elements.

5. A propulsion engine according to claim 3, or claim 4, which comprises an exhaust duct downstream from said fan rotor for air exiting said external turbine, wherein said fan rotor blades are provided with radially spaced platforms defining a path therebetween for said air flowing from said cold turbine to said exhaust duct, the portion of said fan rotor blades located outwardly of said platforms being disposed in said noncombusted air flow duct, and wherein the portion of said blades located between said platforms comprises a final stage of blades for said cold turbine.

6. A propulsion engine of the turbojet type having a gas ejection assembly, comprising:
   a primary unit including at least one compressor and a primary duct leading from the downstream end of said at least one compressor and forming part of the primary air flow path through said engine,
   a secondary unit coaxially surrounding said primary unit and including an annular noncombusted air flow duct and a fan rotor, said fan rotor having at least one stage of compression rotor blades disposed in said noncombusted air flow duct,
   a rotary body which carries said fan rotor,
   support bearings mounting said rotary body so as to surround said primary duct,
   a multi-stage external turbine having a fixed stator assembly and a rotor assembly connected to said rotary body such that said fan rotor is arranged to be driven by said external turbine, and
   an axisymmetrical auxiliary duct communicating with said primary duct near the downstream end of said at least one compressor and leading to said external turbine such that said noncombusted air directed from said primary duct is continuously fed through said auxiliary duct in the flow direction towards the gas ejection assembly, wherein said external turbine is positioned downstream of said fan rotor, and wherein said auxiliary duct is formed by the following three sections:
   an upstream section defined by fixed inner and outer annular walls;
   a downstream section defined by an annular inner wall rigidly connected at its downstream end to said rotor assembly of said external turbine, and an annular outer wall rigidly connected at its downstream end to said fixed stator assembly of said external turbine; and, an intermediate section disposed between said upstream and downstream sections, said intermediate section being defined by an annular outer wall rigidly connected to said fan rotor, and by an annular inner wall rigidly connected at its downstream end to the upstream end of said inner wall of said downstream section, and said intermediate section including a stage of blades interconnecting said inner and outer walls of said intermediate section at the upstream end thereof.

7. A propulsion engine according to claim 6, which comprises labyrinth type seals located between said outer walls of said upstream and intermediate sections, between said inner walls of said upstream and intermediate sections, and between said outer walls of said intermediate and downstream sections.

* * * * *

UNITED STATES PATENT AND TRADEMARK OFFICE
CERTIFICATE OF CORRECTION

PATENT NO. : 5,305,600
DATED : April 26, 1994
INVENTOR(S) : Brossier et al.

It is certified that error appears in the above-indentified patent and that said Letters Patent is hereby corrected as shown below:

Column 4, line 29, change "cold" to --external--.

Column 4, line 31, change "being" to --is--.

Column 4, line 34, change "cold" to --external--.

Signed and Sealed this

Second Day of May, 1995

Attest:

BRUCE LEHMAN

*Attesting Officer*    Commissioner of Patents and Trademarks